(12) United States Patent
Izumi

(10) Patent No.: US 10,252,246 B2
(45) Date of Patent: Apr. 9, 2019

(54) POROUS CERAMIC STRUCTURAL BODY

(71) Applicant: NGK INSULATORS, LTD., Nagoya (JP)

(72) Inventor: Yunie Izumi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 15/459,367

(22) Filed: Mar. 15, 2017

(65) Prior Publication Data

US 2017/0274357 A1 Sep. 28, 2017

(30) Foreign Application Priority Data

Mar. 24, 2016 (JP) .................. 2016-060439

(51) Int. Cl.
 *B01J 23/00* (2006.01)
 *B01J 23/42* (2006.01)
 (Continued)

(52) U.S. Cl.
 CPC .......... *B01J 23/42* (2013.01); *B01D 53/9413* (2013.01); *B01J 23/10* (2013.01); *B01J 35/04* (2013.01); *B01D 2255/1021* (2013.01); *B01D 2255/1023* (2013.01); *B01D 2255/204* (2013.01); *B01D 2255/2022* (2013.01);
 (Continued)

(58) Field of Classification Search
 CPC . B01J 23/42; B01J 23/10; B01J 35/04; B01D 53/9413; B01D 2255/30; B01D 2255/2047; B01D 2255/2065; B01D 2255/1021; B01D 2255/204;
 (Continued)

(56) References Cited

U.S. PATENT DOCUMENTS

| 4,960,574 A | * | 10/1990 | Bricker | ............... B01D 53/945 423/213.5 |
| 7,223,716 B1 | | 5/2007 | Koike et al. | |

(Continued)

FOREIGN PATENT DOCUMENTS

| DE | 696 35 267 T2 | 7/2006 |
| JP | H05-40338 B | 6/1993 |

(Continued)

OTHER PUBLICATIONS

Kumar et al. "Synthesis, characterization and sintering behavior influencing mechanical, thermal and physical properties of pure cordierite and cordierite-ceria" Jan. 31, 2015, Journal of Advanced Ceramics 2015, 4(1): 22-30 (Year: 2015).*

(Continued)

*Primary Examiner* — Haytham Soliman
(74) *Attorney, Agent, or Firm* — Burr & Brown, PLLC

(57) ABSTRACT

A honeycomb structure is formed of a porous ceramic material and has pores in the structural body, wherein cerium dioxide is present in a state that it is incorporated in the structural body in the ceramic material, and at least a part of cerium dioxide particles is exposed on pore surfaces of the pores. The ceramic material includes cordierite or silicon carbide as a major component, the ratio of the cerium dioxide to the ceramic material is in the range of from 1.0% by mass to 10.0% by mass, and at least a part of catalyst particulates of a platinum group element such as platinum or palladium is loaded by the cerium dioxide particles.

6 Claims, 3 Drawing Sheets

(51) Int. Cl.
    *B01D 53/94*     (2006.01)
    *B01J 23/10*     (2006.01)
    *B01J 35/04*     (2006.01)
    *F01N 3/28*     (2006.01)

(52) U.S. Cl.
    CPC ............... *B01D 2255/2047* (2013.01); *B01D 2255/2065* (2013.01); *B01D 2255/2092* (2013.01); *B01D 2255/30* (2013.01); *B01D 2257/404* (2013.01); *B01D 2258/012* (2013.01); *F01N 3/2828* (2013.01); *F01N 2330/06* (2013.01); *F01N 2330/30* (2013.01)

(58) Field of Classification Search
    CPC .... B01D 2255/2022; B01D 2255/2092; F01N 2330/30; F01N 2330/06; F01N 3/2828
    USPC ........................................................ 502/335
    See application file for complete search history.

(56) References Cited

U.S. PATENT DOCUMENTS

| | | | |
|---|---|---|---|
| 7,723,263 | B2 | 5/2010 | Koike et al. |
| 7,763,222 | B2 * | 7/2010 | Miyairi ................. F01N 3/0222 422/177 |
| 8,747,511 | B2 | 6/2014 | Motoki et al. |
| 2001/0053340 | A1 | 12/2001 | Noda et al. |
| 2007/0173403 | A1 | 7/2007 | Koike et al. |
| 2013/0145735 | A1 | 6/2013 | Motoki et al. |
| 2014/0370232 | A1 * | 12/2014 | Izumi ................... C04B 35/565 428/116 |

FOREIGN PATENT DOCUMENTS

| | | |
|---|---|---|
| JP | 4046925 B2 | 2/2008 |
| WO | 2013/047908 A1 | 4/2013 |

OTHER PUBLICATIONS

Machine translation of DE69635267 (Year: 2006).*
German Office Action, German Application No. 10 2017 002 579.7, dated Feb. 19, 2018 (7 pages).

* cited by examiner

POROUS CERAMIC STRUCTURAL BODY

"The present application is an application based on JP-2016-060439 filed on Mar. 24, 2016 with Japan Patent Office, the entire contents of which are incorporated herein by reference."

BACKGROUND OF THE INVENTION

Field of the Invention

The present invention relates to a porous ceramic structural body. More specifically, the porous ceramic structural body relates to a porous ceramic structural body that can be used for various uses such as a catalyst carrier for purifying exhaust gas from automobiles.

Description of the Related Art

Porous ceramic structural bodies have been conventionally used in wide variety of uses such as catalyst carriers for purifying exhaust gas from automobiles, filters for removing diesel particulates, or heat reservoirs for combustion apparatuses. Specifically, many porous ceramic structural bodies each having a honeycomb shape that has a partition wall a plurality of cells, which serve as flow paths for a fluid and extend from one end face to other end face, are defined (hereinafter referred to as "honeycomb structure"). This honeycomb structure is produced by an extrusion molding step in which plural ceramic raw materials are prepared, the raw materials are formed in a kneaded material to give a molding raw material, and subjecting the molding raw material to extrusion molding by using an extruder, and a sintering step in which an extrusion-molded honeycomb formed body is dried and then sintered under predetermined sintering conditions.

As the ceramic material for constituting the porous ceramic structural body, for example, silicon carbide, silicon-silicon carbide-based composite materials, cordierite, mullite, alumina, spinel, silicon carbide-cordierite-based composite materials, lithium aluminum silicate and aluminum titanate, and the like are used.

Here, a honeycomb structure formed by cordierite has advantages such as excellent impact resistance. However, since the honeycomb structure has a specific surface area of the partition wall surface and the like of the honeycomb structure is small, it cannot load a sufficient amount of catalyst, and sometimes cannot exert high catalyst activity by the honeycomb structure in its original form. Therefore, in order to increase a specific surface area, a honeycomb structure is subjected to a coat treatment with γ-alumina. By this way, the specific surface area can be increased, and thus the honeycomb structure can load a catalyst in an amount sufficient to exert high catalyst activity (for example, see Patent Document 1).

On the other hand, in recent years, various rules against exhaust gas emitted from diesel engines and the like have been strictly enforced. Therefore, improvement of the performances of porous ceramic structural bodies such as honeycomb structures used as catalyst carriers for purifying exhaust gas from automobiles is demanded. For example, by making thin walls of partition walls in the honeycomb structure, the heat capacity of the entirety of the honeycomb structure is decreased so that the temperature quickly rises to a temperature at which the catalyst activity of the catalyst is exerted, or providing the partition walls with a structure having a high porosity. Here, when the porosity of the honeycomb structure decreases, there are problems that pressure loss increases and thus the fuel consumption performance of an engine is decreased (see Patent Document 2).

Here, a coat treatment of a honeycomb structure with γ-alumina may clog porous partition walls to thereby decrease porosity. Therefore, a method for loading a sufficient amount of catalyst without requiring a coat treatment with γ-alumina has been considered. For example, a cordierite ceramic honeycomb structure that has been subjected to an acid treatment, subjected to a heat treatment at 600° C. to 1,000° C., and then allowed to load a catalyst component is known (see Patent Document 3). By this way, the specific surface area can be increased, and thus a step of a coat treatment with γ-alumina (so-called "wash coat") can be unnecessary.

[Patent Document 1] JP-B-4046925
[Patent Document 2] WO 2013/047908
[Patent Document 3] JP-B-5-40338

SUMMARY OF THE INVENTION

As mentioned above, in the method for a coat treatment with γ-alumina, the pores in the honeycomb structure (porous ceramic structural body) are clogged, and thus the porosity is decreased. Therefore, the method has a problem of increase in pressure loss.

On the other hand, the method in which an acid treatment and a heat treatment are performed on a porous ceramic structural body as shown in Patent Document 3, any coat treatment with γ-alumina is unnecessary, and thus the weight of the porous ceramic structural body can be saved, and the heat impact resistance can be improved. However, there is a possibility that the crystal lattice itself of cordierite is broken, and thus the strength of the porous ceramic structural body may decrease. Therefore, the development of a porous ceramic structural body which does not require any coat treatment with γ-alumina, and can load a sufficient amount of catalyst for maintaining high catalyst activity without causing decrease in strength is desired.

Therefore, the present invention has been made in view of the above-mentioned actual conditions and aims at providing a porous ceramic structural body that can load a sufficient amount of catalyst for maintaining catalyst activity.

According to the present invention, a porous ceramic structural body that has solved the above-mentioned problem is provided.

According to a first aspect of the present invention, a porous ceramic structural body formed by a porous ceramic material and having pores in the structural body is provided, wherein the ceramic material is present in a state that cerium dioxide is incorporated in the structural body, and at least a part of the cerium dioxide is exposed on the pore surfaces of the pores.

According to a second aspect of the present invention, the porous ceramic structural body according to the first aspect is provided, wherein the ratio of the cerium dioxide to the ceramic material is in the range of from 1.0% by mass to 10.0% by mass.

According to a third aspect of the present invention, the porous ceramic structural body according to the first or second aspects is provided, wherein the ceramic material includes either one of cordierite or silicon carbide as a major component.

According to a fourth aspect of the present invention, the porous ceramic structural body according to any one of the first to third aspects is provided, further including catalyst particulates of a platinum group element distributed on the pore surfaces, wherein at least a part of the catalyst particulates is loaded by the particles of the cerium dioxide exposed on the pore surfaces.

According to a fifth aspect of the present invention, the porous ceramic structural body according to the fourth aspect is provided, wherein the catalyst of the platinum group element is either one of platinum or palladium.

According to a sixth aspect of the present invention, the porous ceramic structural body according to any one of the first to fifth aspects is provided, wherein the porous ceramic structural body is a honeycomb structure.

According to the porous ceramic structural body of the present invention, by exposing the cerium dioxide on the pore surfaces, a part of the catalyst particles is selectively loaded on said cerium dioxide. Therefore, it becomes possible to improve the loading performance of the catalyst particles, and it becomes unnecessary to coat the partition walls.

DESCRIPTION OF THE PREFERRED EMBODIMENTS

Figure 1:
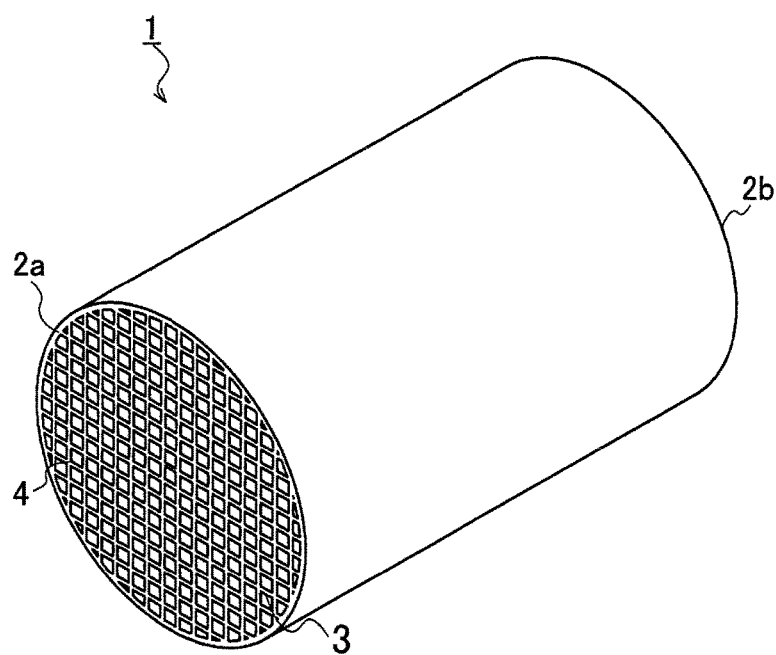
FIG. 1 is a perspective view that schematically shows an example of a schematic constitution of a honeycomb structure.

The embodiments of the porous ceramic structural body of the present invention will be mentioned below in detail with referring to the drawings. However, the porous ceramic structural body of the present invention is not limited to the following embodiments, and various modification, correction, and improvement of designing and the like can be added thereto as long as the embodiments do not deviate from the scope of the present invention.

Figure 2:
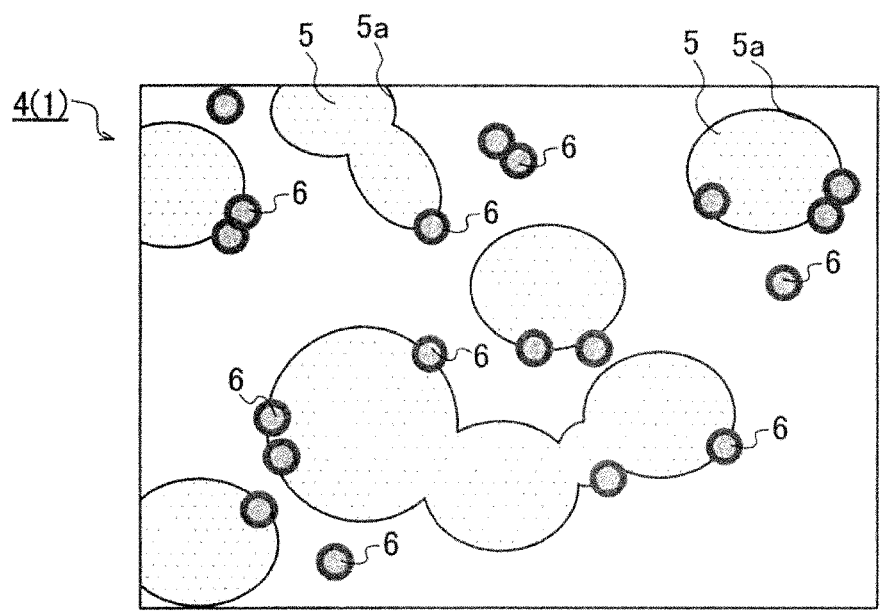
FIG. 2 is an enlarged cross-sectional view that schematically shows the inside of the partition wall of the honeycomb structure of an embodiment of the present invention.

As shown in FIG. 1, the porous ceramic structural body of an exemplary embodiment of the present invention is an approximately round pillar-shaped porous ceramic honeycomb structure 1 having a honeycomb shape (hereinafter simply referred to as "honeycomb structure 1") and having lattice-shaped partition walls 4 that define cells 3 that are formed as flow paths for a fluid extending from one end face 2a to other end face 2b. In the honeycomb structure 1, the partition walls 4 are formed by a porous ceramic material, and plural pores 5 are present in the partition walls 4 (see FIGS. 2 and 3). Specifically, cerium dioxide ($CeO_2$) is present in an incorporated state in the structural body of this porous honeycomb structure 1, and at least a part of particles 6 of this cerium dioxide is formed so as to be exposed on the pore surfaces 5a of the pores 5 in the partition wall 4.

As the ceramic material that forms the honeycomb structure 1 (partition walls 4), a well-known porous material is envisaged, and examples include ceramic materials containing as a major component, silicon carbide, silicon-silicon carbide (Si/SiC)-based composite materials, cordierite, mullite, alumina, spinel, silicon carbide-cordierite-based composite materials, lithium aluminum silicate and aluminum titanate. However, the porous ceramic structural body of the present invention is not limited to the above-mentioned honeycomb structure 1 and may have various shapes. Furthermore, even in the case when the porous ceramic structural body has a honeycomb shape, the porous ceramic structural body is not limited to an approximately round pillar-shaped porous ceramic structural body.

The rate (content rate) of the cerium dioxide contained in the porous ceramic material that constitutes the honeycomb structure 1 of this exemplary embodiment is in the range of from 1.0% by mass to 10.0% by mass, further preferably in the range of from 2.5% by mass to 6.0% by mass. In the case when the rate of the cerium dioxide is lower than 1.0% by mass, the number of the cerium dioxide particles 6 that are exposed on the pore surfaces 5a decreases, and thus a loading amount of catalyst particulates 7 by the particles 6 on the pore surfaces 5a mentioned below is small. As a result, it becomes difficult to load the catalyst in an amount sufficient to obtain high catalyst activity.

On the other hand, when the rate of the cerium dioxide is more than 10.0% by mass, the particles 6 that are exposed on the pore surfaces 5a increase. Therefore, a part of the pores 5 is clogged by the exposed particles 6, and thus it is possible that the porosity of the partition wall 4 decreases and defects such as pressure loss occur. Therefore, the rate of the cerium dioxide is limited to the above-mentioned range.

As mentioned above, the honeycomb structure 1 of this exemplary embodiment is formed in a way such that the cerium dioxide particles 6 are exposed on the surfaces of the plural pores 5 formed in the structural body of the partition walls 4. By this way, a part of the catalyst particulates 7 is selectively loaded by the particles 6. That is, it is not necessary to increase the specific surface area by a conventional coat treatment (wash coat) with γ-alumina, and thus the loading amount of the catalyst can be easily increased. Accordingly, defects such as decrease in pressure loss by a coat treatment with γ-alumina do not occur.

Figure 3:
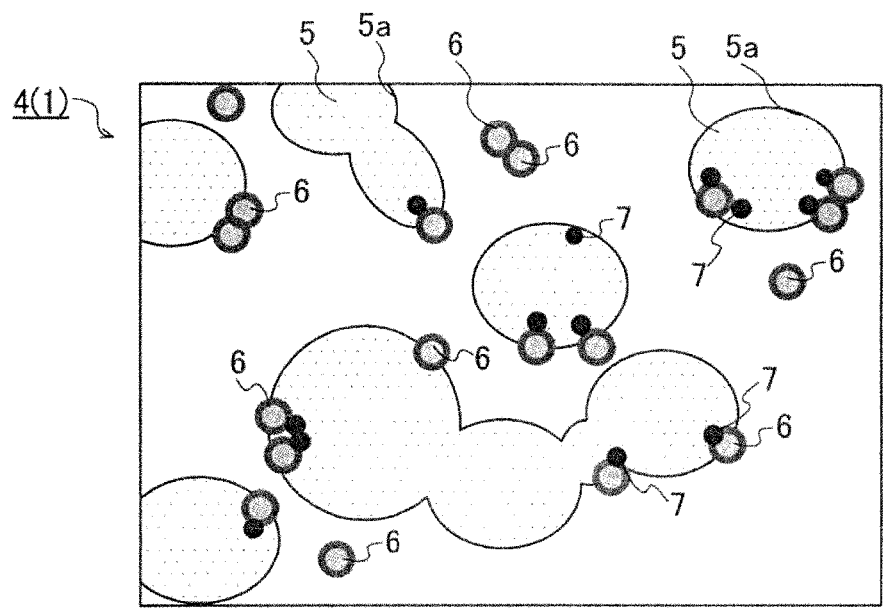
FIG. 3 is an enlarged cross-sectional view that schematically shows the state that a catalyst is loaded by the cerium dioxide particles exposed on the pore surfaces.
Figure 6:
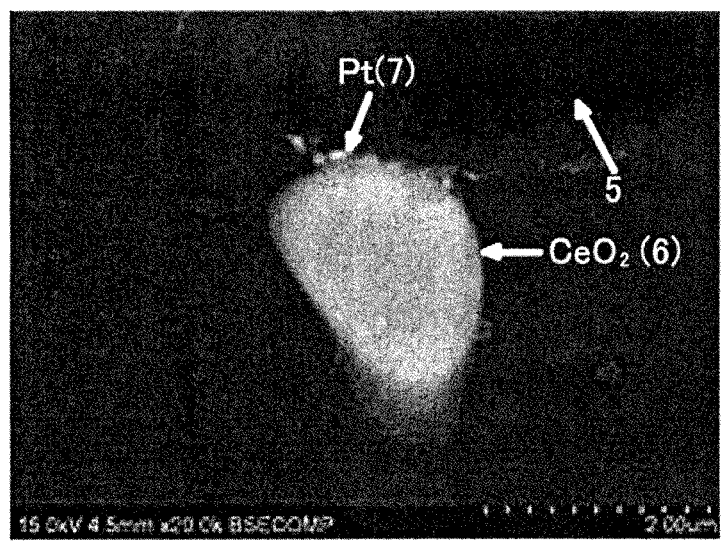
FIG. 6 is an SEM image showing the cerium dioxide exposed on the pore surface and the catalyst particulates (platinum) loaded by the cerium dioxide particle.

The honeycomb structure 1 of this exemplary embodiment further has, in addition to the above-mentioned constitution, catalyst particulates 7 of a platinum group element (ruthenium (Ru), rhodium (Rh), palladium (Pd), osmium (Os), iridium (Ir) and platinum (Pt)) distributed on the pore surfaces 5a in the partition walls 4. At least a part of the catalyst particulates 7 is selectively loaded by the particle surfaces of the above-mentioned cerium dioxide particles 6 exposed on the pore surfaces 5a (see FIGS. 3 and 6). Here, as schematically shown in FIG. 3, the particle size of the cerium dioxide particles 6 is generally larger than the particle size of the catalyst particulates 7.

The catalyst particulates 7 loaded by the particles 6 are not specifically limited as long as they are catalyst particulates of a platinum group element as mentioned above, but it is specifically preferable to use platinum (Pt) or palladium (Pd). These platinum and palladium have been generally used since before as catalysts for purification treatment of $NO_2$. Furthermore, as shown in FIG. 3, it is not always necessary that the catalyst particulates 7 are loaded by the cerium dioxide particles 6, and a part of the catalyst particulates 7 may be directly loaded by the pore surfaces 5a of the pores 5.

According to the honeycomb structure 1 of this exemplary embodiment, the cerium dioxide is present in an incorporated state at a predetermined ratio in the structural body (in the ceramic material) that constitutes said honeycomb structure 1 (partition walls 4), said cerium dioxide particles 6 are exposed on the pore surfaces 5a in the structural body of the partition walls 4, and at least a part of the catalyst particulates 7 such as platinum is selectively loaded by the particles 6. By this way, many catalyst particulates 7 are loaded by the cerium dioxide particles 6 exposed on the pore surfaces 5a. As a result, in the case when the honeycomb structure 1 is used as a catalyst for a purifying treatment of $NO_2$ or the like, high catalyst activity by the catalyst such as loaded platinum can be exerted, whereby a purification rate (conversion rate) of $NO_2$ can be improved. Accordingly, the honeycomb structure can be used as a catalyst that does not cause any defects such as decrease in pressure loss.

The porous ceramic structural body (honeycomb structure) of the present invention will be explained below based on the following Examples, but the porous ceramic structural body of the present invention is not limited to these Examples.

EXAMPLES

The ceramic materials that constitute the honeycomb structures of Examples 1 to 5 and Comparative Examples 1 to 3 (containing an inorganic raw material, and other raw materials), and the content rates thereof and the like will be shown in the following Table 1. Examples 1 to 4 and Comparative Examples 1 to 3 are honeycomb structures in which the ceramic component is cordierite, and Example 5 is a honeycomb structure constituted by a composite material of silicon/silicon carbide (Si/SiC).

1. Preparation of Honeycomb Structure of Example 1

(1) Preparation of Kneaded Material

The inorganic raw materials for a honeycomb structure shown in Table 1 (39.7% by mass of talc, 14.1% by mass of α-alumina, 15.3% by mass of aluminum hydroxide, 17.5% by mass of kaolin, 10.7% by mass of silica and 2.7% by mass of cerium dioxide) are mixed, and as other raw materials, 2.0 parts by mass of coke, 5.4 parts by mass of a foamable resin, 1.5 parts by mass of a water-absorbable resin and 5.0 parts by mass of methyl cellulose are added to 100 parts by mass of the obtained inorganic raw material. The mixture is then mixed for 10 minutes by using a kneader, and 1 part by mass of potassium laurate and 33 parts by mass of water (description in Table 1 is omitted) are added thereto. In the above-mentioned description, the part(s) by mass is based on 100 parts by mass of the inorganic raw material before being mixed with the coke and the like. The mixture is further kneaded by using a kneader for 45 minutes, whereby a flexible kneaded material is prepared.

(2) Preparation of Honeycomb Formed Body

The obtained kneaded material is formed into a pillar shape by using a vacuum pug mill, and the product is introduced into an extrusion molding machine to thereby prepare a honeycomb formed body having a honeycomb shape. The honeycomb formed body herein has a honeycomb diameter of 50 mm, a partition wall thickness of 12 mils (about 0.3 mm), a cell density of 300 cpsi (cells per square inches: 46.5 cells/cm²), and a circumferential wall thickness of about 0.6 mm, and has lattice-like partition walls that define plural cells that serve as flow paths for a fluid inside of the honeycomb formed body.

TABLE 1

| Example/Comparative Example | | Example 1 | Example 2 | Example 3 | Example 4 | Example 5 | Comparative Example 1 | Comparative Example 2 | Comparative Example 3 |
|---|---|---|---|---|---|---|---|---|---|
| Ceramic component | | Cordierite | Cordierite | Cordierite | Cordierite | Si/SiC | Cordierite | Cordierite | Cordierite |
| Talc | % by | 39.7 | 39.7 | 39.7 | 0 | — | 39.7 | 0 | 39.7 |
| Magnesium oxide | mass | 0 | 0 | 0 | 11.9 | — | 0 | 11.6 | 0 |
| α-alumina | | 14.1 | 14.1 | 14.1 | 33.3 | — | 14.1 | 45.0 | 14.1 |
| Aluminum hydroxide | | 15.3 | 15.3 | 15.3 | 0 | — | 15.3 | 0.0 | 15.3 |
| Kaolin | | 17.5 | 17.5 | 17.5 | 0 | — | 17.5 | 0.0 | 17.5 |
| Silica | | 10.7 | 8.4 | 8.4 | 49.1 | — | 13.4 | 43.4 | 13.4 |
| $CeO_2$ | | 2.7 | 5 | 5 | 5.7 | — | 0 | 0 | 0 |
| SiC | | — | — | — | — | 80 | — | — | — |
| Si | | — | — | — | — | 20 | — | — | — |
| Total of inorganic raw materials | | 100 | 100 | 100 | 100 | 100 | 100 | 100 | 100 |
| Coke | parts | 2.0 | 2.0 | 2.0 | 2.0 | — | 2.0 | 2.0 | 2.0 |
| Foamable resin | by | 5.4 | 5.4 | 5.4 | 5.4 | — | 5.4 | 5.4 | 5.4 |
| Water absorbable resin | mass | 1.5 | 1.5 | 1.5 | 1.5 | — | 1.5 | 1.5 | 1.5 |
| Methyl cellulose resin | | 5.0 | 5.0 | 5.0 | 5.0 | 7.0 | 5.0 | 5.0 | 5.0 |
| Aluminum hydroxide | | — | — | — | — | 0.4 | — | — | — |
| Strontium carbonate | | — | — | — | — | 1.4 | — | — | — |
| $CeO_2$ | | — | — | — | — | 5.0 | — | — | — |
| Starch | | — | — | — | — | 3.5 | — | — | — |
| Sintering temperature | °C. | 1400 | 1400 | 1375 | 1400 | 1450 | 1425 | 1425 | 1425 |
| Sintering atmosphere | | Air | Air | Air | Air | Argon | Air | Air | Air |
| Amount of catalyst (Pt) | g/L | 5 | 5 | 5 | 1 | 5 | 5 | 1 | 1 |
| Amount of catalyst ($CeO_2$) | | 0 | 0 | 0 | 0 | 0 | 0 | 0 | 10 |

(3) Drying and Sintering of Honeycomb Formed Body

The prepared honeycomb formed body was subjected to microwave drying, then hot air drying (80° C.×12 hours), and the end faces at the both ends of the honeycomb dried body were cut off so that the length of the honeycomb dried body after the drying in the axial direction became 60 mm. The honeycomb dried body was then subjected to a sintering treatment in the air at a sintering temperature of 1400° C., whereby a honeycomb structure on which any catalyst was not loaded was prepared.

(4) Loading of Catalyst

The obtained honeycomb structure was immersed in a 4.0% by mass aqueous solution of tetraammine platinum nitrate and dried in the air at a drying temperature of 100° C. for 4 hours. The above-mentioned immersion and drying treatments were repeated until the weight increase became 5 g/L of a platinum content with respect to the original honeycomb structure. The honeycomb structure was then sintered in the air at a sintering temperature of 550° C. By this way, the honeycomb structure of cordierite of Example 1 was obtained.

2. Preparation of Honeycomb Structure of Example 2

The honeycomb structure of cordierite of Example 2 was prepared under identical conditions to that of the above-mentioned (1) to (4), except that the content rate of the silica in the inorganic raw material in Example 1 was changed to 8.4% by mass and the content rate of the cerium dioxide was changed to 5.0% by mass.

3. Preparation of Honeycomb Structure of Example 3

The honeycomb structure of cordierite of Example 3 was prepared under identical conditions to that of Example 2, except that the sintering temperature in Example 2 was changed to 1375° C.

(1) Preparation of Honeycomb Formed Body, Drying and Sintering of Honeycomb Formed Body, and Loading of Catalyst The procedures are identical with those of Examples 1 and 2, and thus the explanation is omitted. By this way, the honeycomb structure of cordierite of Example 3 was obtained.

4. Preparation of Honeycomb Structure of Example 4

(1) Preparation of Kneaded Material

The plural kinds of inorganic raw materials (11.9% by mass of magnesium oxide, 33.3% by mass of α-alumina, 49.1% by mass of silica, 5.7% by mass of cerium dioxide) for a honeycomb structure shown in Table 1 are mixed, and as other raw materials, 2.0 parts by mass of coke, 5.4 parts by mass of a foamable resin, 1.5 parts by mass of a water-absorbable resin, and 5.0 parts by mass of methyl cellulose are added to 100 parts by mass of the obtained inorganic raw material. The mixture is then mixed for 10 minutes by using a kneader, and 1 part by mass of potassium laurate and 33 parts by mass of water (description in Table 1 is omitted) are added. In the above description, the part(s) by mass is based on the same criterion as that of Example 1. The mixture is further kneaded by using a kneader for 45 minutes, whereby a flexible kneaded material is prepared.

(2) Preparation of Honeycomb Formed Body, Drying and Sintering of Honeycomb Formed Body, and Loading of Catalyst The procedures are identical with those of Examples 1 and 2, and thus the explanation is omitted. However, the catalytic amount of the platinum content was set to be 1 g/L. By this way, the honeycomb structure of cordierite of Example 4 was obtained.

5. Preparation of Honeycomb Structure of Example 5

(1) Preparation of Kneaded Material

The two kind of inorganic raw materials for a honeycomb structure shown in Table 1 (80% by mass of silicon carbide (SiC) and 20% by mass of silicon (Si)) are mixed, and 0.4 parts by mass of aluminum hydroxide, 1.4 parts by mass of strontium carbonate, 5.0 parts by mass of cerium dioxide, 3.5 parts by mass of starch and 7.0 parts by mass of a methyl cellulose resin are added to 100 parts by mass of the obtained ceramic material. Thereafter, the mixture is mixed by using a kneader for 10 minutes, and 27% parts by mass of water (the description in Table 1 is omitted) is added thereto. In the above-mentioned description, the part(s) by mass is based on 100 parts by mass of the ceramic material as the total of silicon carbide and silicon. The mixture is further kneaded by using a kneader for 45 minutes, whereby a flexible kneaded material is prepared.

(2) Preparation of Honeycomb Formed Body

Since the preparation is identical with those in Examples 1 to 4, the explanation is omitted.

(3) Drying and Sintering of Honeycomb Formed Body

The prepared honeycomb formed body was subjected to microwave drying, then hot air drying (80° C.×12 hours), and the end faces at the both ends of the honeycomb dried body were cut off so that the length of the honeycomb dried body after the drying in the axial direction became 60 mm. The honeycomb dried body was then subjected to a sintering treatment under argon atmosphere at a sintering temperature of 1450° C., whereby a honeycomb structure on which any catalyst was not loaded was prepared.

(4) Loading of Catalyst

The obtained honeycomb structure was immersed in a 4.0% by mass aqueous solution of tetra ammine platinum nitrate, and dried in the air at a drying temperature of 100° C. for 4 hours. The above-mentioned immersion and drying treatment were repeated until the weight increase became 0.1% by mass of a platinum content with respect to the original honeycomb structure. The honeycomb structure was then sintered in the air at a sintering temperature of 550° C. By this way, the honeycomb structure of silicon/silicon carbide (Si/SiC) of Example 5 was obtained.

6. Preparation of Honeycomb Structure of Comparative Example 1

The honeycomb structure of cordierite of Comparative Example 1 was obtained under identical conditions with those of Example 1, except that cerium dioxide was not added, the content rate of the silica in the raw material was set to 13.4% by mass, and the sintering temperature was preset to 1425° C.

7. Preparation of Honeycomb Structure of Comparative Example 2

The honeycomb structure of cordierite of Comparative Example 2 was obtained under identical conditions with those of Example 4, except that cerium dioxide was not added, and the content rates in the raw material were set to 11.6% by mass of magnesium oxide, 45.0% by mass of α-alumina and 43.4% by mass of silica.

7. Preparation of Honeycomb Structure of Comparative Example 3

(1) Preparation of Catalyst 24 g of a 4.0% by mass aqueous solution of ammine platinum nitrate was added to 10 g of water, the mixture was stirred by a stirrer for 30 minutes, a cerium dioxide powder was put therein, and the temperature was raised to evaporate the water content while the mixture was stirred. After the water content had been evaporated, the product was dried in the air at a drying temperature of 100° C. for 4 hours, and further sintered in the air at a sintering temperature of 550° C. for 1 hour. The product obtained after the sintering was sieved to give a catalyst.

(2) Loading of Catalyst 4.5 g of the obtained catalyst was added to 100 g of water, and the mixture was stirred by a stirrer, whereby a catalyst liquid was prepared. Subsequently, a honeycomb structure prepared in a similar manner to that of Comparative Example 1 was immersed in said catalyst liquid, and dried in the air at a drying temperature of 100° C. for 4 hours. The above-mentioned immersion and drying treatment were repeated until the weight increase became 1 g/L of a platinum content with respect to the original honeycomb structure. The honeycomb structure was then sintered in the air at a sintering temperature of 550° C. By this way, the honeycomb structure of cordierite of Comparative Example 3 was obtained.

Figure 4:
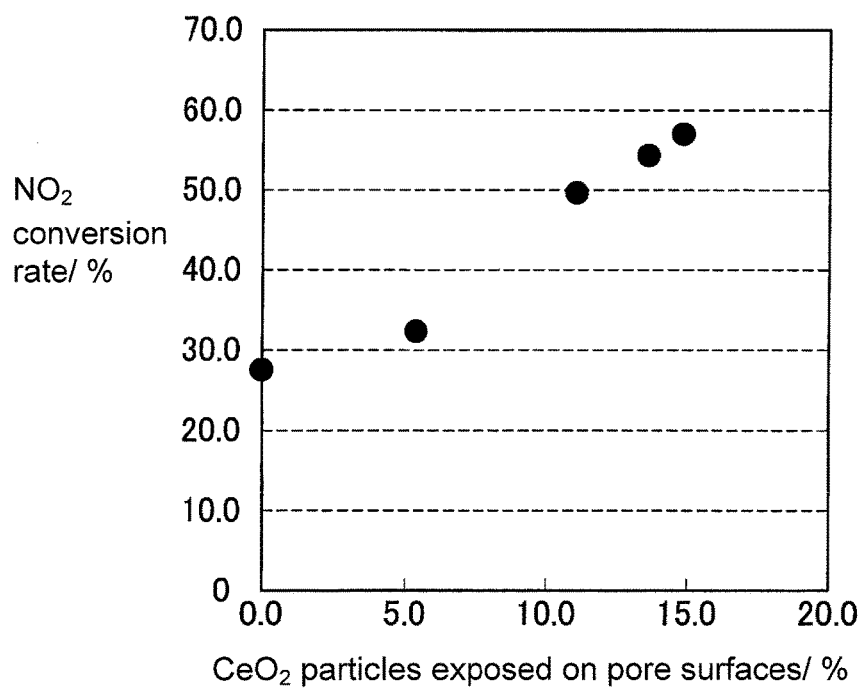
FIG. 4 is a graph showing the correlation relationship of the ratio of the cerium dioxide particles exposed on the pore surfaces and the $NO_2$ conversion rate.
Figure 5:
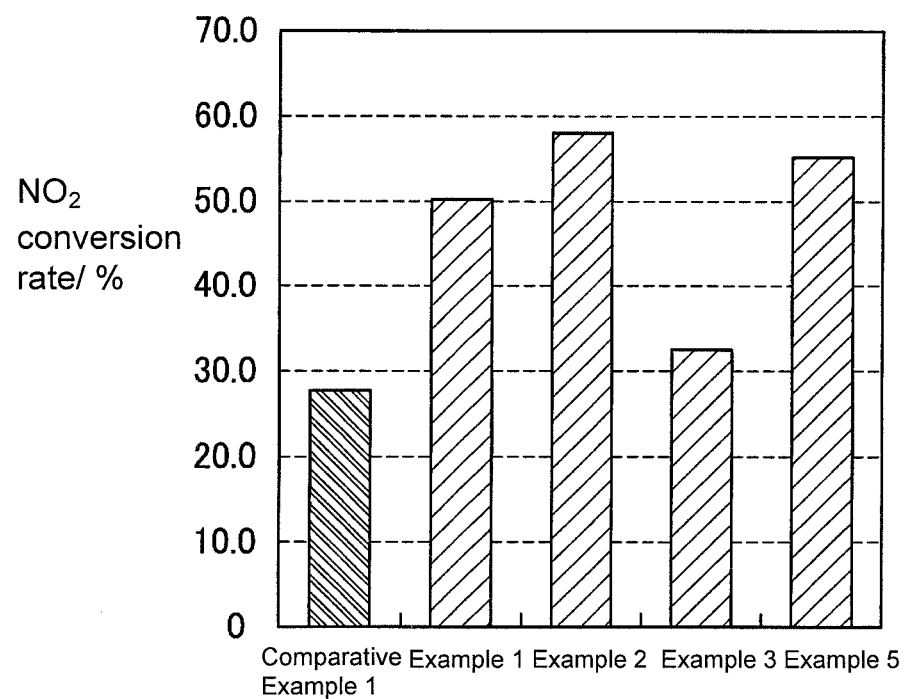
FIG. 5 is a graph showing the $NO_2$ conversion rates of Comparative Example 1, and Examples 1 to 3 and 5.

The following evaluation items: the $NO_2$ conversion rate, the particle diameter of the cerium dioxide ($CeO_2$), and the rate of the $CeO_2$ particles exposed on the pore surfaces, were respectively measured for the prepared honeycomb structures of Examples 1 to 5 and Comparative Examples 1 to 3. The summarization of the measurement result is shown in the following Table 2, and FIGS. 4 and 5. FIG. 5 shows the comparison in the case when the amount of the Pt catalyst is 5 g/L, in which illustration is omitted for Example 4 and Comparative Examples 2 and 3.

the other hand, a mixing gas with a nitrogen balance of NO (carbon monoxide): 200 ppm and oxygen ($O_2$): 10% adjusted to a gas temperature of 250° C. was prepared, and introduced into the measurement sample set in the reaction tube. At this time, the gas (exhaust gas) emitted from the measurement sample was analyzed by using an exhaust gas measurement apparatus (manufactured by HORIBA, Ltd.: MEXA-6000FT), and the respective exhaust concentrations (NO concentration and $NO_2$ concentration) were measured. Based on the measurement results, the $NO_2$ conversion rate (1-NO concentration/(NO concentration+$NO_2$ concentration)) was calculated. In the case when the loading amount of platinum was 5 g/L, the sample having the $NO_2$ conversion rate of 45% or more was evaluated to be "fine", the sample having the $NO_2$ conversion rate of 30% or more and lower than 45% was evaluated to be "acceptable (this corresponds to an example)", and the sample having the $NO_2$ conversion rate of lower than 30% was evaluated to be "unacceptable (this corresponds to a comparative example).

9. Evaluation Item (Particle Diameter of Cerium Dioxide)

The particle diameter of the cerium dioxide was calculated by image analysis. The prepared honeycomb structure (porous ceramic structural body) was enclosed in a resin and subjected to mirror surface polishing by using a diamond slurry and the like, and the product was used as an observation sample for the image analysis. This cross-sectional polished surface that had undergone the mirror surface polishing was observed under a scanning electron microscope at 10,000-fold magnification, whereby a reflection electron image photograph (microstructure image) of the porous ceramic structural body was obtained. The obtained reflection electron image photograph was subjected to binarization processing by using image analysis software (trade name: Image-Pro0.7), and adjusting the contrast so as to distinguish the area of cordierite from the area of cerium dioxide. By such binarization treatment, the profile of each cross-sectional area of cerium dioxide was determined, and the particle diameter of cerium dioxide was measured.

TABLE 2

| Example/Comparative Example | | Example 1 | Example 2 | Example 3 | Example 4 | Example 5 | Comparative Example 1 | Comparative Example 2 | Comparatve Example 3 |
|---|---|---|---|---|---|---|---|---|---|
| $NO_2$ conversion rate | % | 50.1 | 57.8 | 32.4 | 25.0 | 55.0 | 27.6 | 5.0 | 18.0 |
| Particle diameter of $CeO_2$ | μm | 0.045 | 0.02 | 3.0 | 0.025 | 2.0 | None | None | <0.05 |
| Rate of $CeO_2$ particles exposed on pore surfaces | % | 11.0 | 14.8 | 5.4 | 2.5 | 13.6 | 0.0 | None | None |

8. Evaluation Item ($NO_2$ Conversion Rate)

Each of the honeycomb structures prepared as above (Examples 1 to 5 and Comparative Examples 1 to 3) was processed into a sample specimen having a diameter (=Φ) of 25.4 mm×a length (=L) of 50.8 mm, and the processed outer periphery was coated with a similar material to that of the substrate. This was evaluated as a measurement sample by using an automobile exhaust gas analyzer. At this time, the above-mentioned measurement sample was set in a reaction tube in a temperature raising furnace and kept at 250° C. On

10. Rate of Cerium Dioxide ($CeO_2$) Particles Exposed on Pore Surfaces

The rate of the cerium dioxide particles was calculated by image analysis in a similar manner to that in the above-mentioned 9. In this evaluation, the cross-sectional polished surface that had undergone mirror surface polishing was observed under a scanning electron microscope at 750-fold magnification, whereby a reflection electron image photograph (microstructure image) of the porous ceramic structural body was obtained. The obtained image photograph was subjected to binarization processing by using similar image analysis software to that used in the above-mentioned 9, the profile of each cross-sectional area of cerium dioxide was determined, and the number of the cerium dioxide in the reflection electron image photograph was counted. Furthermore, the number of the cerium dioxide in contact with the pore surfaces was counted, and the rate (%) of the cerium dioxide particles disposed (exposed) on the pore surfaces, that is, the counted number of the cerium dioxide disposed on the pore surfaces/the number of the total cerium dioxide× 100, was calculated. In the case when the catalytic amount of platinum was 5 g/L, the sample in which the rate of the cerium dioxide particles exposed on the pore surfaces was 10% or more was evaluated to be "fine", the sample in which the rate was 3% or more and lower than 10% was evaluated to be "acceptable (this corresponds to an example)", and the sample in which the rate was lower than 3% was evaluated to be "unacceptable (this corresponds to a comparative example) (except for Example 4).

11. Consideration of Evaluation Results

As shown in Table 2, it was confirmed that Examples 1 to 5, which contained cerium dioxide, showed higher $NO_2$ conversion rates than those of Comparative Examples 1 to 3, which were free from cerium dioxide (see FIG. 5). This result shows the effect of loading of platinum by a part of cerium dioxide. Furthermore, it was confirmed that, in the cases when the rate of the cerium dioxide particles exposed on the pore surfaces was 10% or more (Examples 1, 2 and 5), the $NO_2$ conversion rates were high as 50% or more (see FIG. 4).

This result showed a possibility that higher catalyst performance is exerted at a higher rate of the exposed cerium dioxide on the pore surfaces. Furthermore, it was confirmed that a porous ceramic material of a silicon carbide component (Si/SiC) as in Example 5 also has a similar effect to that of cordierite. In addition, it was confirmed that the effect of the present invention cannot be obtained even cerium dioxide is used simply as a catalyst as in Comparative Example 3, and thus it is necessary that the cerium dioxide is present in a state that it is contained in the structural body (incorporated state) as the constitutional component of the porous ceramic structural body, and a part of the cerium dioxide is exposed on the pore surfaces.

Although the preferable porous ceramic structural bodies of the present invention have been shown in the above-mentioned embodiments and Examples, but the present invention is not limited to these embodiments and Examples. For example, a porous ceramic structural body containing other metal oxide, which has a structural body containing cerium dioxide therein, wherein a part of the cerium dioxide has been substituted with a rare earth element or a transition metal element is also acceptable.

The porous ceramic structural body of the present invention can be preferably utilized as a catalyst carrier such as a catalyst carrier for purifying exhaust gas from automobiles.

DESCRIPTION OF REFERENCE NUMERALS

1: honeycomb structure (porous ceramic honeycomb structure, porous ceramic structural body), 2a: one end face, 2b: other end face, 3: cell, 4: partition wall, 5: pore, 5a: pore surface, 6: particle, 7: catalyst particulate.

What is claimed is:

1. A porous ceramic structural body comprising a plurality of porous partition walls that define a plurality of cells formed by a porous ceramic material and having pores in the partition walls of the structural body,
    wherein the ceramic material is present in a state that cerium dioxide is incorporated as particles having a diameter in a range of from 0.025 μm to 3.0 μm in the partition walls of the structural body, at least a part of the cerium dioxide is exposed on the pore surfaces of the pores, and a ratio of cerium dioxide particles exposed on the pore surfaces is in a range of from 2.5% to 14.8%.

2. The porous ceramic structural body according to claim 1, wherein the ratio of the cerium dioxide to the ceramic material is in the range of from 1.0% by mass to 10.0% by mass.

3. The porous ceramic structural body according to claim 1, wherein the ceramic material comprises either one of cordierite or silicon carbide as a major component.

4. The porous ceramic structural body according to claim 1, further comprising catalyst particulates of a platinum group element distributed on the pore surfaces,
    wherein at least a part of the catalyst particulates is loaded by the particles of the cerium dioxide exposed on the pore surfaces.

5. The porous ceramic structural body according to claim 4, wherein the catalyst of the platinum group element is either one of platinum or palladium.

6. The porous ceramic structural body according to claim 1, wherein the porous ceramic structural body is a honeycomb structure.

* * * * *